United States Patent
Murakami

(10) Patent No.: US 9,417,981 B2
(45) Date of Patent: Aug. 16, 2016

(54) DATA PROCESSING SYSTEM, DATA PROCESSING METHOD, AND PROGRAM

(75) Inventor: Junichi Murakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 423 days.

(21) Appl. No.: 14/110,666

(22) PCT Filed: May 11, 2011

(86) PCT No.: PCT/JP2011/060836
§ 371 (c)(1),
(2), (4) Date: Oct. 8, 2013

(87) PCT Pub. No.: WO2012/153400
PCT Pub. Date: Nov. 15, 2012

(65) Prior Publication Data
US 2014/0052413 A1  Feb. 20, 2014

(51) Int. Cl.
*G06F 11/30* (2006.01)
*H04L 12/24* (2006.01)
*H04L 12/26* (2006.01)

(52) U.S. Cl.
CPC .......... *G06F 11/3003* (2013.01); *H04L 41/142* (2013.01); *H04L 41/147* (2013.01); *H04L 43/067* (2013.01)

(58) Field of Classification Search
USPC ........................................................ 702/187
See application file for complete search history.

(56) References Cited

FOREIGN PATENT DOCUMENTS

| JP | 2002-260142 A | 9/2002 |
|----|---------------|--------|
| JP | 2005-196238 A | 7/2005 |
| JP | 2008-311719 A | 12/2008 |

OTHER PUBLICATIONS

Ewout W. Steyerberg, NIH Public Access, Assessing the performance of prediction models: a framework for some traditional and novel measures, Published in final edited form as: Epidemiology. Jan. 2010 ; 21(1): 128-138. doi: 10.1097/EDE.0b013e3181c30fb2, p. 1-21.*

* cited by examiner

*Primary Examiner* — Tung S Lau
(74) *Attorney, Agent, or Firm* — Volpe and Koenig, P.C.

(57) ABSTRACT

A data processing system for storing observation data including an observation value corresponding to a point in a storage area and calculating a comparison value to be compared with a future observation value, the data processing system comprising: an observation data collection unit for specifying first observation data and second observation data which are observation data before the first point; a past similar data selection unit for selecting parts for the same duration as the first predetermined time, the observation values of which are identical to the observation values of the first observation data, from the second observation data as past similar data; a parameter data selection unit for selecting the observation values for a predetermined time from the latest time of the parts selected as the past similar data as parameter data; and a comparison value calculation unit for calculating the comparison value based on the parameter data.

12 Claims, 9 Drawing Sheets

| 2241 | 2242 | 2243 | 2244 | 224 |
|---|---|---|---|---|
| TIME | CHARACTERISTIC INFORMATION (AVERAGE VALUE) | DAY OF WEEK | PROCESS NAME | |
| ... | ... | ... | ... | |
| 10:00 | 50 | THURSDAY | A | |
| 10:01 | 53 | THURSDAY | A | |
| 10:02 | 45 | THURSDAY | A | |
| ... | ... | ... | ... | |
| t | 35 | THURSDAY | T | |
| ... | ... | ... | ... | |

DATA PROCESSING SYSTEM, DATA PROCESSING METHOD, AND PROGRAM

BACKGROUND OF THE INVENTION

The present invention relates to a data processing system for calculating a comparison value to be compared with observation data and particularly to a data processing system for calculating a comparison value based on past observation data.

In recent years, a stream mining technique for analyzing useful rules, useful patterns and the like from time-series data in real time has attracted attention as the amount of data to be handled has become huge. For example, by the application of the stream mining technique to the monitoring of an IT system, a behavior of the IT system different from a normal one can be detected. Since this enables a sign of a silent failure to be detected, this silent failure can be dealt with before occurring.

Conventionally, a failure detection technique (abnormality determination technique) in IT systems is for determining that a current value is an abnormal value different from a normal value when the current value deviates from a reference value (baseline), which is a value in normal time, by a predetermined value (threshold value) or more.

A method for automatically setting a threshold value from a periodical tendency of past data of periodic time-series data (e.g. data of network traffic or the like) is known as a method for setting a threshold value for highly accurate and efficient execution of abnormality determination (see, for example, patent literature 1).

In a method disclosed in patent literature 1, a statistic (average value and standard deviation) of time-series data is calculated based on a period, a representative time (sampling time), a consideration period (data width for calculating the average value and standard deviation) for the representative time included in configuration definition information set by a user, and the threshold value is automatically set based on the calculated statistic.

Patent Literature 1: JP2008-311719A

SUMMARY OF THE INVENTION

The abnormality determination technique according to the conventional art has the following first to third problems.

The first problem is described.

A period of time-series data is not always constant and may possibly vary from day to day. For example, a peak value of network traffic is between 15:00 and 16:00 in some days while being between 18:00 and 19:00 shifted by 3 hours in other days although an overall waveform is similar to that of the days in which the peak value is between 15:00 and 16:00.

In the conventional art, a threshold value at a point of time A of a certain period is set based on a value at the same point of time A of a past period. Thus, in the conventional art, a peak value at shifted time is detected as an abnormal value such as when the overall waveform is similar, but a time at which the peak value is reached is shifted. In other words, the conventional art has a possibility that an abnormal value is erroneously detected or an abnormal value cannot be detected if a period is shifted.

The second problem is described.

Since the user has to set a point of time and the like used for the calculation of the threshold value in the conventional art, the user needs to know a characteristic time of time-series data in advance and needs to have a rule of thumb.

The third problem is described.

To utilize the regularity of time-series data, a threshold value needs to be set based on similar time-series data. For example, even among data series whose variation period is one day period, a pattern of data variation may differ in one period such as weekdays and holidays. Since the threshold value is calculated without distinguishing periods having different patterns of data variation in the conventional art, the reliability of the time-series data for the calculation of the threshold value is low and the threshold value cannot be accurately set.

In view of the above, one object of the present invention is to provide a comparison value calculation system for preventing an erroneous detection and setting an accurate threshold value.

A representative example of this invention is as follows. A data processing system for storing observation data including an observation value corresponding to a point of an observation target in a storage area and calculating a comparison value to be compared with a future observation value based on observation data stored in the storage area, the statistical value calculation system comprising: an observation data collection unit for collecting the observation data from the observation target, storing the collected observation data in the storage area and specifying first observation data from a first point earlier by a first predetermined time than a current point to the current point and second observation data which are observation data before the first point; a past similar data selection unit for selecting at least one of parts for the same duration as the first predetermined time, the observation values of which are identical or similar to the observation values of the first observation data for the first predetermined time, from the second observation data as past similar data; a parameter data selection unit for selecting the observation values for a second predetermined time from the latest time of at least one of the parts selected as the past similar data as parameter data; and a comparison value calculation unit for calculating the comparison value based on the parameter data.

According to an embodiment of this invention, a comparison value calculation system for preventing an erroneous detection and setting an accurate threshold value can provided.

DETAILED DESCRIPTION OF THE PREFERRED EMBODIMENTS

Hereinafter, an embodiment of the present invention is described with reference to the drawings. To clarify the description, the following description and the drawings are omitted and simplified as appropriate. Further, the same elements are denoted by the same reference signs in each drawing and repeated description is omitted if necessary to clarify the description.

The embodiment of the present invention is described below with reference to FIGS. 1 to 11.

Figure 1:
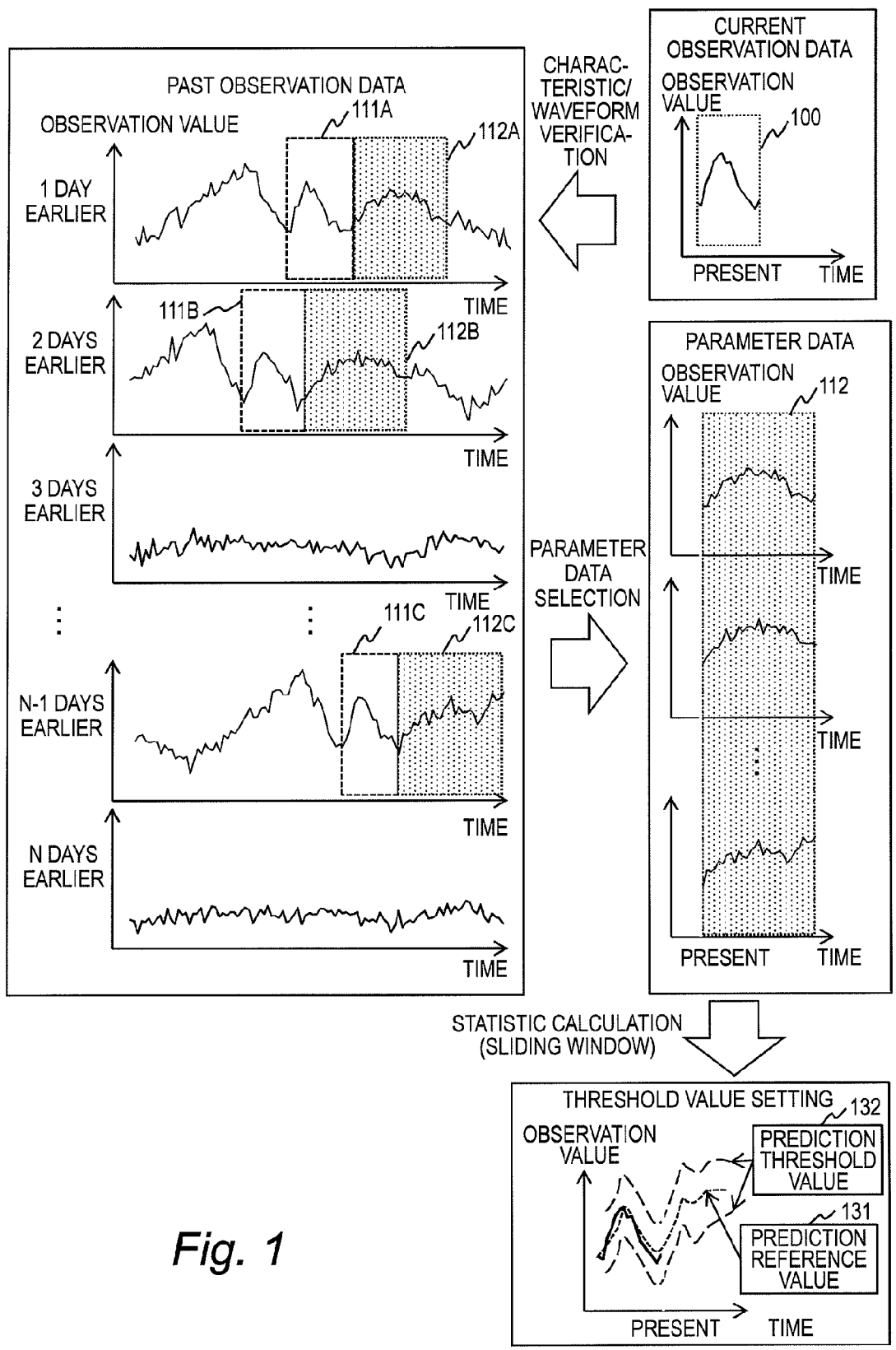
FIG. 1 is a schematic diagram of a comparison value calculation method carried out by a comparison value calculation system of an embodiment of a present invention.

FIG. 1 is a schematic diagram of a comparison value calculation method carried out by a comparison value calculation system of the embodiment of the present invention.

In the comparison value calculation method of the present embodiment, parts (111A to 111C) identical or similar to current observation data 100 are selected as past similar data 111 from past observation data 110, and observation data (112A to 112C) for a predetermined time from the latest time of the selected past similar data 111 are selected as parameter data 112. Then, a prediction reference value 131, which is an average value of the selected parameter data 112 at each point of time, is calculated and prediction threshold values 132 are calculated by giving a predetermined width to the prediction reference value 131.

This is specifically described below.

The current observation data 100 is observation data for a predetermined time (e.g. 1 hour) before the current time, i.e. most recent observation data.

From the past observation data 110 earlier than the current observation data 100, parts whose observation data for the predetermined time (e.g. 1 hour) are identical or similar to the current observation data 100 are selected as the past similar data 111. In FIG. 1, the part of the past observation data 110 one day earlier denoted by 111A, the part of the past similar data 110 two days earlier denoted by 111B and the part of the past observation data 110 (n−1) days earlier denoted by 111C are selected as the past similar data 111.

Subsequently, a part (112A to 112C) for a predetermined time (e.g. 3 hours) from each part of the past observation data 110 selected as the past similar data 111 is selected as the parameter data 112.

Then, the selected parameter data 112 are caused to correspond to the current time of the observation data and an average value of observation data information corresponding to each time of the parameter data 112 is calculated as the prediction reference value 131. Then, the prediction threshold values 132 are calculated by giving a predetermined range to the prediction reference value 131.

In this way, the prediction reference value 131 and the prediction threshold values 132 in the future can be calculated from the current time and, when an observation value is newly obtained, it can be immediately compared with at least one of the comparison value of the prediction reference value 131 and the prediction threshold values 132. Then, a sign of an abnormality can be detected by determining based on the comparison value whether or not the newly obtained observation value is an abnormal value.

Further, since the parts identical or similar to the current observation data 100 are selected as the past similar data 111 from the past similar data 110 and the parameter data 112 of the selected past similar data 111 are selected, the parameter data 112 as a basis of the comparison value do not depend on time unlike the conventional art. Thus, even if a peak time of the current observation data 100 deviates from that of the past observation data 110, an erroneous detection and the like can be prevented and an accurate comparison value can be set. Further, since the sampling and the like of the past observation data 110 are not necessary, a user needs not know a characteristic of the past observation data 110 in advance.

Figure 2:
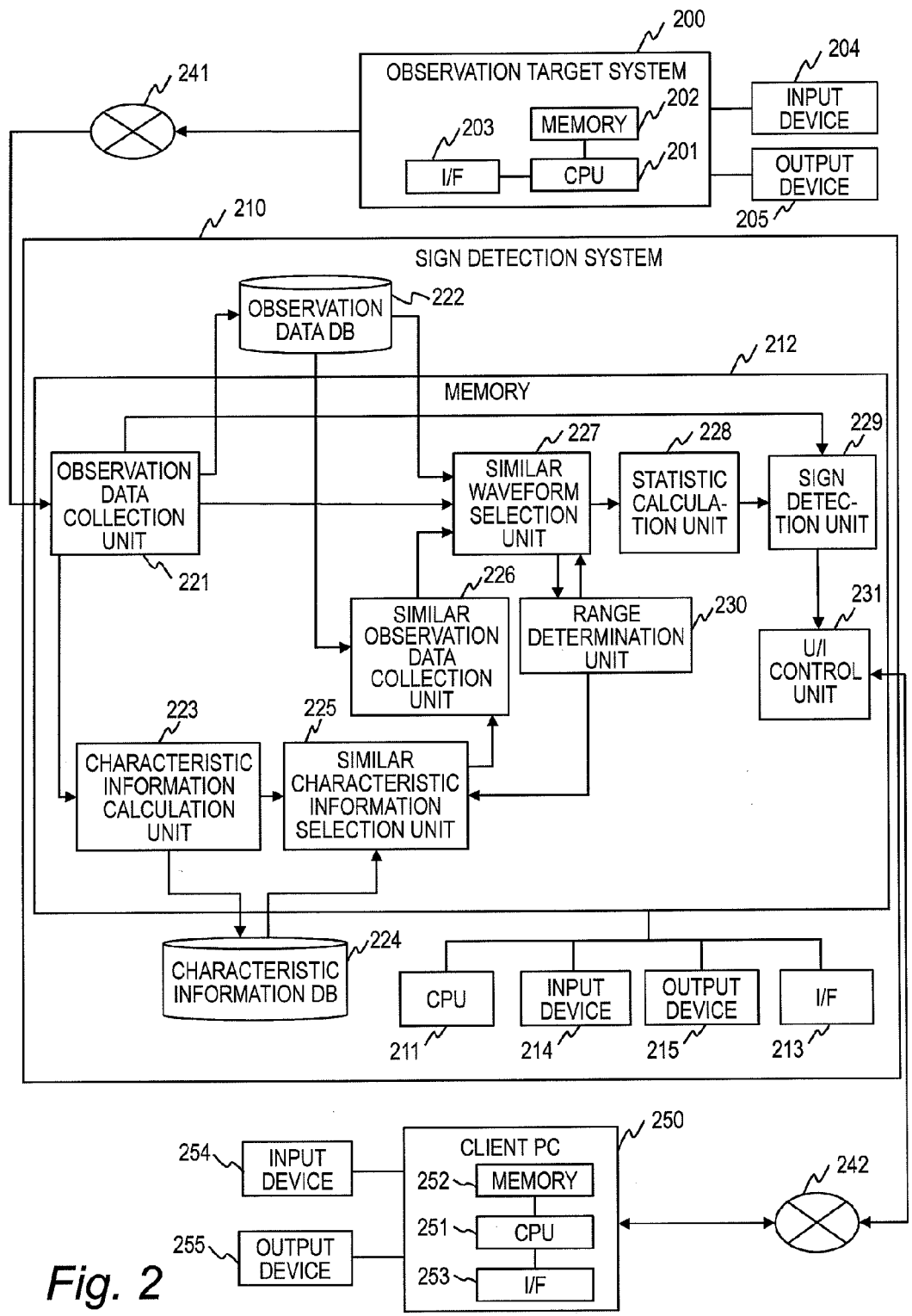
FIG. 2 is a block diagram of the comparison value calculation system of the embodiment of the present invention.

FIG. 2 is a block diagram of the comparison value calculation system of the embodiment of the present invention.

The comparison value calculation system includes an observation target system 200, a sign detection system 210 and a client PC 250. It should be noted that the observation target system 200 and the sign detection system 210 are connected via a network 241 and the client PC 250 and the sign detection system 210 are connected via a network 242.

The observation target system 200 is a computer system (IT system) which is a target for data observation by the sign detection system 210. The observation target system 200 is, for example, a computer including a CPU 201, a memory 202, an interface (I/F) 203, an input device 204 and an output device 205.

For example, the sign detection system 210 digitizes and monitors data on the operating of the observation target system 200. It should be noted that the data on the operation of the observation target system 200 include, for example, network traffic and the like of the observation target system 200. Further, an observation target of the sign detection system 210 is not limited to computer systems and only has to be some kind of data.

The CPU 201 executes various programs stored in the memory 202. Various programs to be executed by the CPU 201 and various data to be used by the CPU 201 are stored in the memory 202. The I/F 203 functions as a network interface for connecting the observation target system 200 to the network 241 and an input/output interface for connecting the observation target system 200 to the input device 203 and the output device 204.

The sign detection system 210 collects observation data from the observation target system 200 and the like, calculates a comparison value to be compared with the current observation data 100 based on the collected observation data, and detects a sign of an abnormality by determining whether or not the current observation data 100 is abnormal through the comparison of the current observation data 100 and the comparison value.

The sign detection system 210 includes a CPU 211, a memory 212, an interface 213, an input device 214 and an output device 215.

The CPU 211 executes various programs stored in the memory 212. Various programs to be executed by the CPU 211 and various data to be used by the CPU 211 are stored in the memory 212. The I/F 213 functions as an input/output interface for connecting the sign detection system 210 to the input device 214 and the output device 215. The input device 214 is a device for receiving an input from a user and, for example, a keyboard, a mouse and the like. The output device 215 is a device for outputting data to the user and, for example, a display and the like.

The client PC 250 is a PC utilized by the user of the sign detection system 210 and displays a sign detection screen 1100 (see FIG. 11) displaying the current observation data 100 and the comparison value. The client PC 250 includes a CPU 251, a memory 252, an interface (I/F) 253, an input device 254 and an output device 255.

The CPU 251 executes various programs stored in the memory 252. Various programs to be executed by the CPU 251 and various data to be used by the CPU 251 are stored in the memory 252. The I/F 253 functions as a network interface for connecting the client PC 250 to the network 242 and an input/output interface for connecting the client PC 250 to the input device 253 and the output device 254.

It should be noted that, if the sign detection system 210 outputs a sign detection parameter setting screen 1000 (see FIG. 10), the sign detection screen 1100 (see FIG. 11) and the like to the output device 215 thereof, the comparison value calculation system may not include the client PC 250.

Next, the programs stored in the sign detection memory 212 are described.

In the memory 212 are stored a program which functions as an observation data collection unit 221, a program which functions as a characteristic information calculation unit 223, a program which functions as a similar characteristic information selection unit 225, a program which functions as a similar observation data collection unit 226, a program which functions as a similar waveform selection unit 227, a program which functions as a statistic calculation unit 228, a program which functions as a sign detection unit 229, a program which functions as a range determination unit 230 and a program which functions as a user interface control unit (U/I control unit) 231.

Further, an observation data database (DB) 222 and a characteristic information database (DB) 224 are stored in an unillustrated storage device provided in the sign detection system 210. This storage device needs not be mounted in the same case as the sign detection system 210 and may be a storage device accessible by the sign detection system 210 via a network.

A function realized by the execution of each program stored in the memory 212 by the CPU 210 is referred to as a unit corresponding to the executed program. For example, a function realized when the program that functions as the observation data collection unit 221 is executed by the CPU 212 is referred to as the observation data collection unit 221.

The observation data collection unit 221 periodically collects an observation value of an observation target and stores the collected observation value and a time, at which this observation value was measured, as observation data in the observation data DB 222. For example, the observation data collection unit 221 collects observation data up to the current time after the collection of the last observation data. The observation data collected by the observation data collection unit 221 is referred to as the current observation data 100.

If the user desires to set data with a width different from an observation data collection period of the observation data collection unit 221 as the current observation data 100, the observation data collection unit 221 obtains observation data for a time desired by the user before the current time from the observation data DB 222 and sets data in this section of time as the current observation data 100.

The observation data collected by the observation data collection unit 221 are stored in the observation data DB 222. It should be noted that the observation data DB 222 is described in detail with reference to FIG. 4.

The characteristic information calculation unit 223 calculates characteristic information of the current observation data 100 and stores the calculated characteristic information in the characteristic information DB 224. The characteristic information may be, for example, an average value of the observation values of the current observation data 100 or an average value of gradients (accelerations) of the observation values of the current observation data 100 at each point of time. In this embodiment, a case is described where the characteristic information is an average value.

The similar characteristic information selection unit 225 selects characteristic information identical or similar to the characteristic information of the current observation data 100 obtained from the characteristic information calculation unit 223 out of characteristic information stored in the characteristic information DB 224 and specifies the point of time of the observation data as a calculation source of the selected characteristic information when the current time has reached a time set by the range determination unit 230.

Since the characteristic information of the current observation data 100 is stored in the characteristic information DB 224, the characteristic information of the observation data for the same duration are stored in the characteristic information DB 224. The characteristic information DB 224 is described in detail with reference to FIG. 5.

The similar observation data collection unit 226 collects past observation data for a duration corresponding to the point of time specified by the characteristic information calculation unit 223 from the observation data DB 222 and inputs the collected past observation data to the similar waveform selection unit 227.

The similar waveform selection unit 227 accumulates the input past observation data and obtains the current observation data 100 from the observation data collection unit 221 when the past observation data is input from the similar waveform selection unit 226. Then, the similar waveform selection unit 227 selects the past observation data, the waveform of which is identical or similar to that of the obtained current observation data 100, as the past observation data 111 out of the accumulated past observation data. A specific selection processing of the past similar data 111 is described in detail with respect to processings in Steps 308 and 309 of FIG. 3.

Subsequently, the similar waveform selection unit 227 obtains observation data for a predetermined time after the selected past similar data 111 from the observation data DB 222 and inputs the obtained parameter data 112 to the range determination unit 230.

The range determination unit 230 specifies utilizable parts indicating parts utilizable for the calculation of the comparison value out of the parameter data 112 input from the similar waveform selection unit 227, and notifies the specified utilizable parts to the similar waveform selection unit 227. Further, the range determination unit 230 notifies a time obtained by adding the time of the specified utilizable part to the current time as a reselection time to the similar characteristic information selection unit 225. It should be noted that a utilizable range specification processing of the range determination unit 230 is described in detail with reference to the processing of Step 310 of FIG. 3 and FIGS. 8 and 9.

The similar waveform selection unit 227 inputs the utilizable part of the parameter data 112 to the statistic calculation unit 228 when the utilizable part of the parameter data 112 is notified from the range determination unit 230.

The statistic calculation unit 228 calculates an average value and a standard deviation of the utilizable parts of the parameter data 112 and inputs the calculated average value and standard deviation to the sign detection unit 229 when the utilizable parts of the parameter data 112 are input from the similar waveform selection unit 227.

The sign detection unit 229 generates display data of the sign detection screen 1100 using the average value input from the statistic calculation unit 228 as the prediction reference value 131 and values calculated by adding and subtracting an arbitrary parameter α to and from the input average value using Equation (1) as the prediction threshold values 132.

[Equation 1]

$$\text{PREDICTION THRESHOLD VALUE} = \text{AVERAGE VALUE} \pm \alpha \times \text{STANDARD DEVIATION} \quad (1)$$

Further, the sign detection unit 229 generates display data for highlighting a part in which the observation value of the current observation data 100 is in excess of the prediction threshold value 132 in the case of generating the display data of the sign detection screen 1100. It should be noted that highlighting is described in detail with reference to FIG. 11.

The sign detection unit 229 inputs the generated display data of the sign detection screen 1100 to the U/I control unit 231.

The U/I control unit 231 outputs the display data input from the sign detection unit 229 to the client PC 250 via the network 242.

It should be noted that the programs for realizing the aforementioned respective functions need not be stored in one memory, and may be distributed among and stored in memories of a plurality of computers and the sign detection system 200 may be realized by the plurality of computers.

Further, information such as the programs for realizing the respective functions, tables and files can be stored in computer-readable non-temporary data storage media such as a nonvolatile semiconductor memory, a hard disk drive, an SSD (Solid State Drive) or another storage device, or an IC card an SD card or a DVD.

Figure 3:
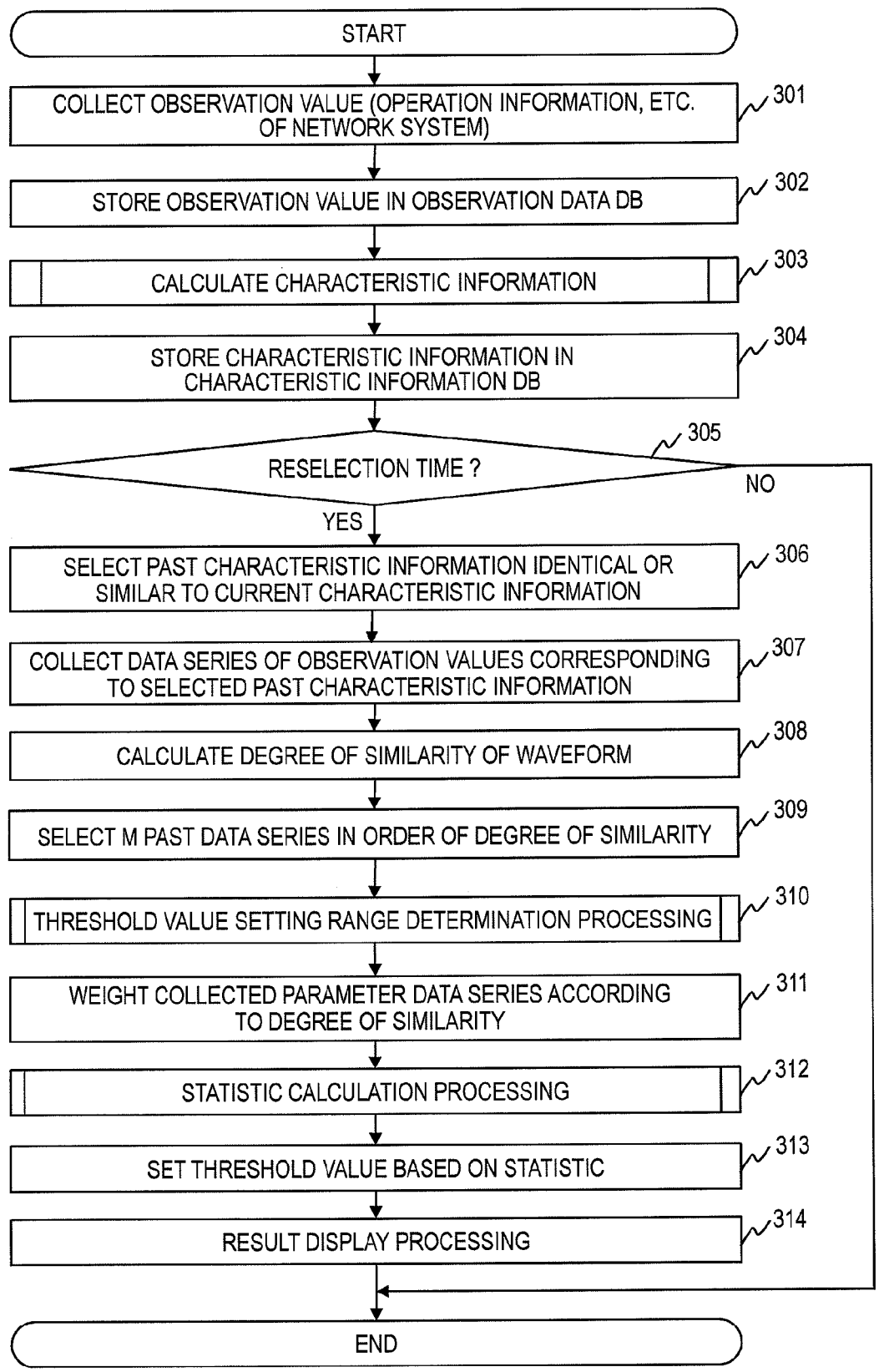
FIG. 3 is a flow chart of a comparison value calculation process by a sign detection system of the embodiment of the present invention.

FIG. 3 is a flow chart of a comparison value calculation process by the sign detection system 210 of the embodiment of the present invention.

The comparison value calculation process is performed by the CPU 211 of the sign detection system 210.

First, the CPU 211 collects observation data of an observation target (301) and stores the collected observation data in the observation information DB 222 (302) by executing the program that functions as the observation data collection unit 221.

In the processing of Step 301, the CPU 211 sets observation data for a time earlier by a predetermined time than the current time to the current time as the current observation data 100.

Subsequently, the CPU 211 calculates characteristic information of the current observation data 100 by executing the program that functions as the characteristic information calculation unit 223 (303). In the processing of Step 303, an average value of the current observation data 100 is calculated as characteristic information by a sliding window processing. It should be noted that the sliding window processing is described in detail with reference to FIGS. 6 and 7.

Then, the CPU 211 stores the characteristic information calculated in the processing of Step 303 in the characteristic information DB 224 (304).

Subsequently, the CPU 211 determines whether or not the current time has reached a reselection time for parameter data 112 by executing the program that functions as the similar characteristic information selection unit 225 (305).

If it is determined in the processing of Step 305 that the current time has not reached the reselection time for the parameter data 112, the comparison value calculation process is finished since the currently calculated comparison value can be utilized.

If it is determined in the processing of Step 305 that the current time has reached the reselection time for the parameter data 112, the CPU 211 selects characteristic information identical or similar to the characteristic information of the current observation data 100 calculated in the processing of Step 304 out of the characteristic information stored in the characteristic information DB 222 (306).

Specifically, the CPU 211 selects characteristic information in a range of a predetermined value from the characteristic information of the current observation data 100 out of the characteristic information stored in the characteristic information DB 222 and specifies the time of the selected characteristic information.

In the processing of Step 306, as many pieces of characteristic information as a similar characteristic amount data selection number (n) set by the user are selected.

Subsequently, the CPU 211 collects past observation data for a duration corresponding to the time specified in the processing of Step 306 as past similar data candidates from the observation data DB 222 by executing the program that functions as the similar observation data collection unit 226 (307).

The processing of Step 307 is specifically described.

The characteristic information calculated for the current observation data 100 by the characteristic information calculation unit 223 and time information of the current observation data 100 as the calculation source of the characteristic information are stored in the characteristic information DB 222.

It should be noted that since the characteristic information calculation unit 223 calculates the characteristic information of the current observation data 100 every time the observation data collection unit 221 collects a new observation value, new characteristic information is stored in the characteristic information DB 222 every time the observation data collection unit 221 collects a new observation value.

Accordingly, the similar observation data collection unit 226 can specify a time window of the current observation data 100, for which the characteristic information was calculated, from time information of the characteristic information stored in the characteristic information DB 222. Then, the similar observation data collection unit 226 refers to the observation data DB 222 and collects observation data in the specified time window as past similar data candidates.

Subsequently, the CPU 211 calculates a degree of similarity of all the observation values of each past similar data candidate to the observation values of the current observation data 100 by executing the program that functions as the similar waveform selection unit 227 (308).

The CPU 211 calculates a coefficient of correlation between the current observation data 100 and the past similar data candidates as a degree of similarity. Specifically, the CPU 211 calculates the degree of similarity of each past similar data candidate to the current observation data 100 by calculation of Equation (2).

[Equation 2]

$$r = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}} \quad (2)$$

where r denotes the coefficient of correlation, x denotes the observation value of the current observation data, y denotes the observation value of the past similar data candidate, i=1 to i=n denote each point of time of the current observation data and the past similar data candidates.

Then, the CPU 211 selects m past similar data candidates in a decreasing order of the degree of similarity out of the n past similar data candidates as the past similar data 111 and selects observation data for a predetermined time (parameter data acquisition range) from the latest time of each past similar data 111 as the parameter data 112 (309).

It should be noted that the number of the past similar data 111 selected in the processing of Step 309 is the parameter data selection number (m) set by the user.

Subsequently, the CPU 211 performs a threshold value setting range determination processing by executing the program that functions as the range determination unit 230 (310).

The threshold value setting range determination processing is a processing for specifying utilizable parts for the calculation of the comparison value from the parameter data acquisition range selected as each parameter data 112. It should be noted that the threshold value setting range determination processing is described in detail with reference to FIGS. 8 and 9.

Subsequently, the CPU 211 sets a weight for each parameter data 112 based on the degree of similarity calculated in the processing of Step 309 by executing the program that functions as the statistic calculation unit 228 (311).

Specifically, the CPU 211 sets a higher weight for the parameter data 112 with a higher degree of similarity calculated in the processing of Step 309.

Then, the CPU 211 causes the earliest time of the utilizable parts of the parameter data 112 to correspond to the current time, calculates an average value of the utilizable parts of the parameter data 112 at each point of time, and performs a statistic calculation processing for calculating a standard deviation at each point of time of the utilizable part of the parameter data 112 based on the calculated average value (312). That is, a prediction reference value for the time of the utilizable part of the parameter data 112 is calculated from the current time.

It should be noted that the CPU 211 calculates the average value of the parameter data 112 by performing the sliding window processing to be described with reference to FIGS. 6 and 7.

Subsequently, the CPU 211 calculates the threshold values by calculation of Equation (1) based on the average value and the standard deviation of the utilizable parts of the parameter data 112 calculated in the processing of Step 312 by executing the program that functions as the sign detection unit 229 (313). That is, based on the prediction reference value for the time of the utilizable parts of the parameter data 112 from the current time, the prediction threshold values for this time are calculated in the processing of Step 313.

Then, the CPU 211 generates display data of the sign detection screen 1100 displaying the average value calculated in the processing of Step 312 as the prediction reference value 131 and the threshold values calculated in the processing of Step 313 as the prediction threshold values 132, inputs the generated display data to the U/I control unit 231 (314) and finishes the comparison value calculation process. It should be noted that the U/I control unit 231 transmits the display data to the client PC 250 via the network 242 and the client PC 250 displays the sign detection screen 1100 on the output device 255 when receiving the display data.

In the present embodiment, the past similar data candidates are selected based on the characteristic information in the processing of Step 306 before the past similar data 111 are selected based on the degree of similarity of the waveform in the processing of Step 309. Since a processing load of the processing for calculating the degree of similarity of the waveform on the CPU 211 is higher than that of the processing for calculating the characteristic information on the CPU 211, a processing load on the CPU 211 can be reduced if the execution number of the processing for calculating the degree of similarity of the waveform is reduced. Thus, in the present embodiment, the observation data for which the degree of similarity of the waveform is calculated are reduced by selecting the past similar data candidates based on the characteristic information.

Figures 4, 5:
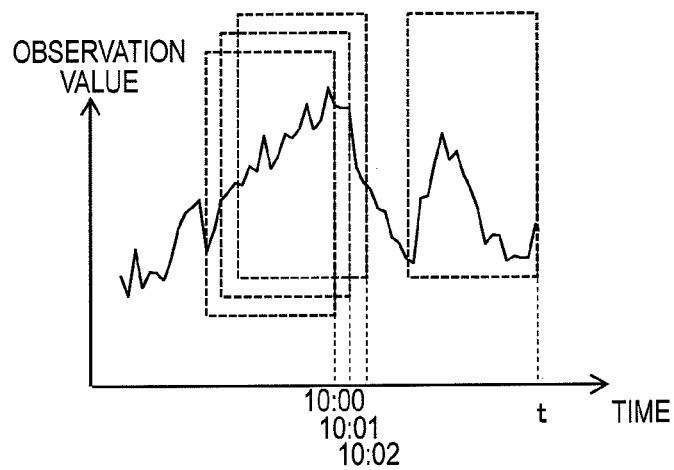
FIG. 4 is a graph of observation data stored in an observation data DB of the embodiment of the present invention.
FIG. 5 is a table of a characteristic information DB of the embodiment of the present invention.

FIG. 4 is a graph of the observation data stored in the observation data DB 222 of the embodiment of the present invention.

The observation data collected by the observation data collection unit 221 are stored in the observation data DB 222.

Since the observation data includes the observation value and the time at which this observation value was observed, the time information and the observation value observed at this time are stored as one record in the observation data DB 222.

FIG. 4 is a graphical representation of records stored in the observation data DB 222. Specifically, in FIG. 4, the times of the records stored in the observation data DB 222 are plotted along a horizontal axis and the observation values at these times are plotted along a vertical axis.

FIG. 5 is a table of the characteristic information DB 224 of the embodiment of the present invention.

The characteristic information DB 224 includes time 2241, characteristic information (average value) 2242, day of week 2243 and process name 2244.

The time at which the current observation data 100, for which the characteristic information was calculated, had been collected by the observation data collection unit 221 is registered under the time 2241. An average value of the current observation data 100 is registered under the characteristic information 2242. The day of week on which the current observation data 100, for which the characteristic information was calculated, had been collected by the observation data collection unit 221 is registered under the day of week 2243. A unique identifier of the process for generating the current observation data 100 out of processes performed by the observation target system 200 is registered under the process name 2244.

Here, a method for registering the process name 2244 is described.

Observation data collected from the observation target system 200 includes a unique identifier of a process performed by the observation target system 200 at a point of time corresponding to an observation value. The characteristic information calculation unit 223 calculates an average value of the current observation data 100 and registers the unique identifier of the process included in the observation data, which becomes the current observation data 100 under the process name 2244 in the case of registering the calculated average value under the characteristic information 2242.

The similar characteristic information selection unit 225 refers to the time 2241 and the characteristic information 2242 of the characteristic information DB 224 and selects the characteristic information in the range of the predetermined value from the characteristic information of the current observation data 100 out of the past characteristic information as described in the processing of Step 306 shown in FIG. 3. Thus, the characteristic information DB 224 only has to essentially include the time 2241 and the characteristic information (average value) 2242, and the day of week 2243 and the process name 2244 are additional items.

A method for utilizing the day of week 2243 and the process name 2244 are described.

Observation data collected on the same day of the week tend to be more similar to each other than to observation data on the day of the week different from certain observation data. For example, a degree of similarity between observation data collected on Monday tends to be higher than that between observation data collected on Monday and observation data collected on Sunday.

Further, observation data generated by the same process tend to be more similar to each other than to observation data generated by a process different from that of a certain observation value.

For example, the similar characteristic information selection unit 225 may select the characteristic information, at least one of the day of week registered under the day of week 2243 and the process name registered under the process name 2244 of which matches the day of week and the process name of the current observation data 100 out of the past characteristic information and select the characteristic information identical or similar to the characteristic information of the current observation data 100 from the selected characteristic information in the processing of Step 306 shown in FIG. 3.

Since the sign detection system 210 selects the past observation data with a high possibility of being similar to the current observation data 100 in this way, the number of the past observation data to be selected can be reduced. Thus, the sign detection system 210 can reduce the execution number of the degree of similarity calculation processing in Step 308, wherefore the processing load on the CPU 211 can be reduced.

Further, in the case of setting a weight for the parameter data 112 in the processing of Step 311, the statistic calculation unit 228 may set higher weights for the parameter data 112 based on the past similar data 111, at least one of the day of week registered under the day of week 2243 and the process name registered under the process name 2244 of which matches the day of week and the process name of the current observation data 100 than for the parameter data 112, neither the day of week registered under the day of week 2243 nor the process name registered under the process name 2244 of which matches the day of week and the process name of the current observation data 100.

Since this enables the sign detection system 210 to set a comparison value by increasing the weight of the parameter data 112 with a high possibility of being similar to the current observation data 100, a degree of reliability of the comparison value can be increased.

It should be noted that the statistic calculation unit 228 may set a higher weight for the parameter data 112 based on the past similar data 111, the both of the day of week registered under the day of week 2243 and the process name registered under the process name 2244 of which match the day of week and the process name of the current observation data 100 than for the parameter data 112 based on the past similar data 111, one of the day of week registered under the day of week 2243 and the process name registered under the process name 2244 of which matches the day of week and the process name of the current observation data 100.

Next, the sliding window processing is described with reference to FIGS. 6 and 7.

Figure 6:
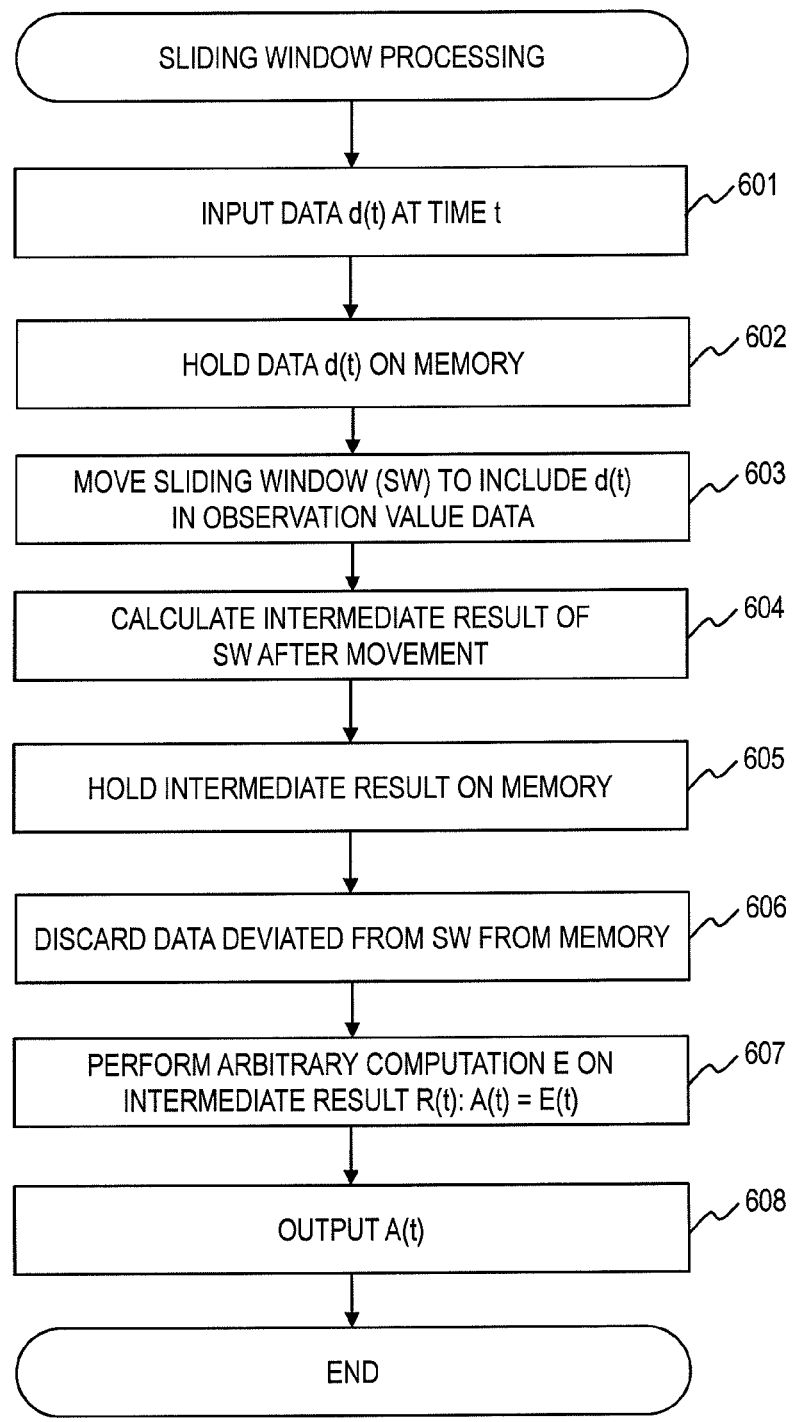
FIG. 6 is a flow chart of sliding window processing of the embodiment of the present invention.

FIG. 6 is a flow chart of the sliding window processing of the embodiment of the present invention.

The sliding window processing is a processing included in the program that functions as the characteristic information calculation unit 223 and the program that functions as the statistic calculation unit 228, and performed by the CPU 211.

The sliding window processing is a processing for calculating a total value of observation values for a duration (sliding window width) which is a time earlier by a predetermined time than time t to the time t.

First, when an observation value d(t) at time t is input to the CPU 211 (601), the CPU 211 holds observation data d(t) on the memory 212 (602).

Subsequently, the CPU 211 slides (moves) a sliding window to include the observation value d(t) with respect to the observation data (603).

Subsequently, the CPU 211 calculates a current intermediate result (R(t)) which is the total of the observation values within the sliding window (current sliding window) moved in the processing of Step 603 (604).

Here, the processing of Step 604 (intermediate result calculation processing) is described.

The CPU 211 specifies an excluded observation value deviated from the current sliding window out of the observation values within the sliding window before being moved in the processing of Step 603. The CPU 211 specifies an added observation value added to the current sliding window. Then, the CPU 211 calculates a current intermediate result by subtracting the excluded observation value from the last intermediate result and adding the added observation value to the subtraction value.

Figure 7:
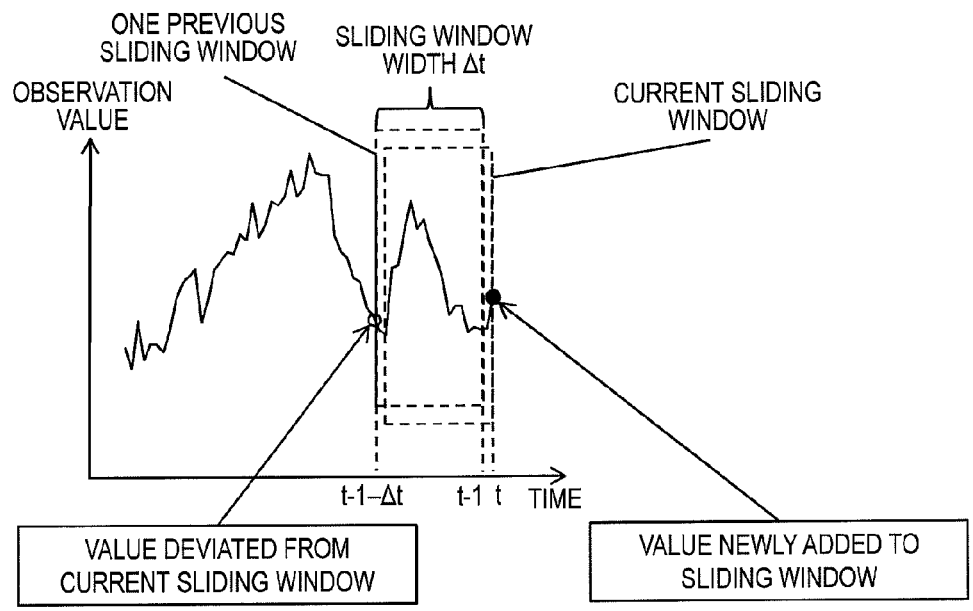
FIG. 7 is a graph showing intermediate result calculation processing of the embodiment of the present invention.

The intermediate result calculation processing is described using FIG. 7.

FIG. 7 is a graph showing the intermediate result calculation processing of the embodiment of the present invention.

If it is assumed that a time input in the last sliding window processing is a time t−1 shown in FIG. 7 and Δt denotes a sliding window width, a time deviated from the current sliding window is a time t−Δt−1 and the excluded observation value is an observation value d(t−Δt−1). Further, the added observation value is an observation value d(t). Thus, the current intermediate result (R(t) can be calculated by Equation (3).

[Equation 3]

$$R(t)=R(t-1)-d(t-\Delta t-1)+d(t) \qquad (3)$$

It should be noted that, in FIG. 7, the intermediate result is 343−26+33=350 if one previous intermediate result is specified to be "343", the excluded observation value is specified to be "26" and the added observation value is specified to be "33".

In this way, in the sliding window processing, the total value of the current sliding window is obtained only by a calculation of subtracting the excluded observation value from the intermediate result of one previous sliding window and a calculation of adding the added observation value to this subtraction value even without totaling all the observation values within the current sliding window. This can reduce a processing load on the sign detection system 210.

Subsequently, the CPU 211 holds the intermediate result calculated in the processing of Step 604 on the memory 212 (605) and discards the excluded observation value deviated from the current sliding window out of the observation values from the memory 212 (606).

Subsequently, the CPU 211 performs an arbitrary computation E on the intermediate result calculated in the processing of Step 604, outputs a computation result A(t) (608) and finishes the sliding window processing.

The computation E in the processing of Step 608 is changed by a value calculated in the sliding window processing and is a division of the intermediate result R(t) by the sliding window width Δt in the case of calculating an average value.

It should be noted that an example of calculating an average value "35" of the observation values within the sliding width by dividing the intermediate result "350" by a sliding window width "10" is shown concerning the processing of Step 608 in FIG. 7.

Subsequently, the threshold value setting range determination processing is described using FIGS. 8 and 9.

Figure 8:
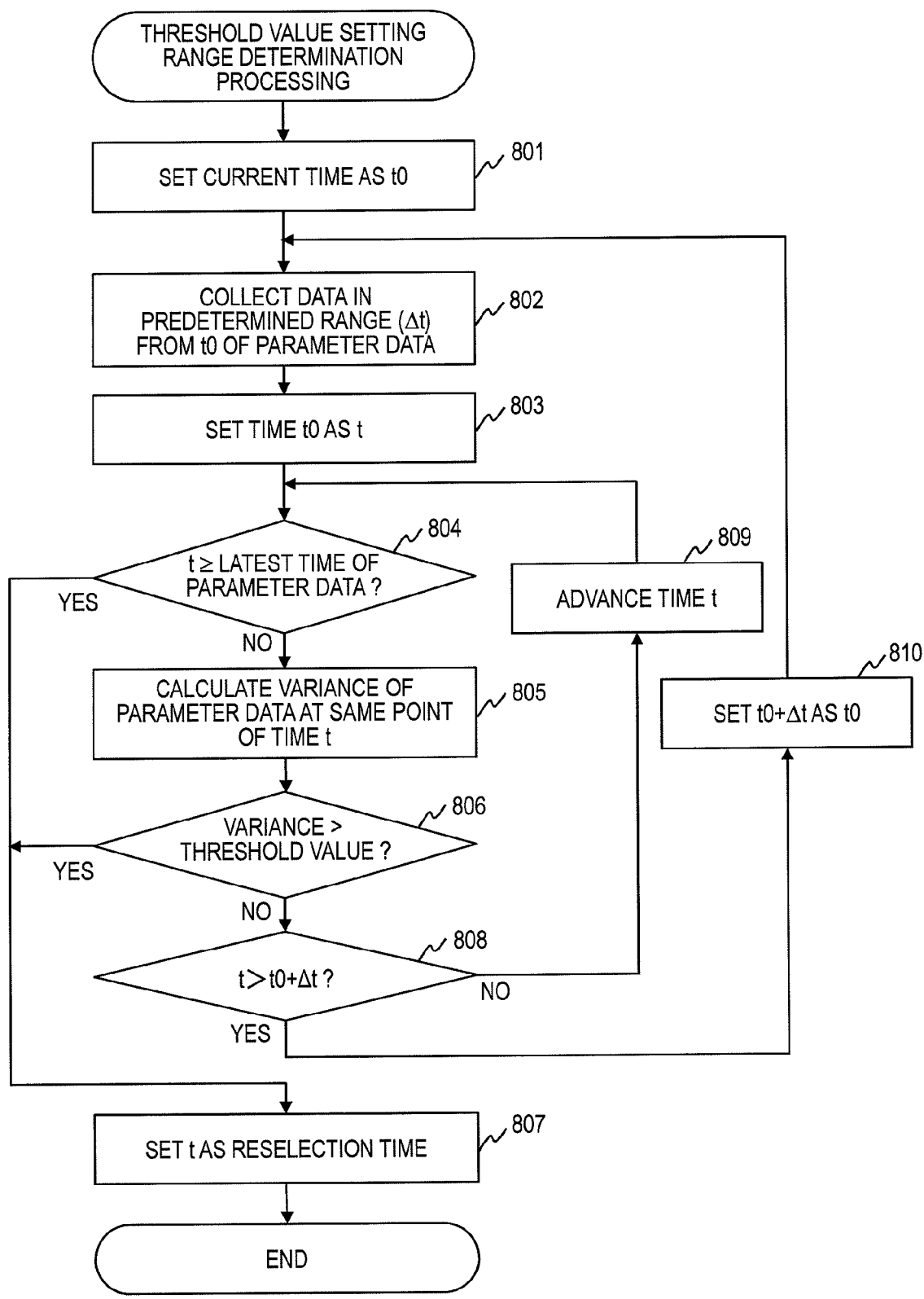
FIG. 8 is a flow chart of threshold value setting range determination processing of the embodiment of the present invention.

FIG. 8 is a flow chart of the threshold value setting range determination processing of the embodiment of the present invention.

The threshold value setting range determination processing is a processing included in the program that functions as the range determination unit 230, and performed by the CPU 211.

First, the CPU 211 sets the current time as a variable t0 and sets the earliest time of the collected parameter data 112 as the current time (801). Then, the CPU 211 collects observation data for a predetermined time (Δt) after the time set as a variable t of the parameter data 112 (802). This predetermined time is a time shorter than the parameter data acquisition range. Then, the CPU 211 sets the time set as the variable t0 as the variable t (803).

Subsequently, the CPU 211 determines whether or not the time set as the variable t is not earlier than the latest time of the parameter data 112 (804).

If the time set as the variable t is determined to be not earlier than the latest time of the parameter data 112 in the processing of Step 804, there is no parameter data 112 for which the threshold value setting range determination processing is to be performed. Thus, the CPU 211 sets the time set as the variable t as a reselection time (807) and finishes the threshold value setting range determination processing. It should be noted that since the earliest time of the parameter data 112 is set as the current time in the processing of Step 801, the latest time of the parameter data 112 is a time obtained by adding the parameter data acquisition range to the current time.

On the other hand, if the time set as the variable t is determined to be earlier than the latest time of the parameter data 112 in the processing of Step 804, the CPU 211 calculates a variance of the observation values at the same point of time t of the collected m parameter data (805).

Specifically, the CPU 211 calculates an average value of the observation values of the collected m parameter data at the same point of time t. Then, the CPU 211 calculates a variance at the same point of time t based on the calculated average value.

Subsequently, the CPU 211 determines whether or not the variance calculated in the processing of Step 805 is larger than the threshold value (806).

If the variance calculated in the processing of Step 805 is determined to be larger than the threshold value in the processing of Step 806, the observation values of the m parameter data 112 at the time of the variable t are dissimilar and it cannot be ensured that the observation values of the m parameter data 112 after the time of the variable t are identical or similar. Thus, the CPU 211 sets the time set as the variable t as the reselection time in the processing of Step 807 and finishes the threshold value setting range determination processing to select the parameter data 112 after the time set as the variable t.

On the other hand, if the variance calculated in the processing of Step 805 is determined to be not larger than the threshold value in the processing of Step 806, the CPU 211 determines whether or not the processings of Steps 805 and 806 have been performed on the observation values of the observation data collected in the processing of Step 802 at all the times (808). Specifically, the CPU 211 determines whether or not the time set as the variable t is later than a time obtained by adding the predetermined time, during which the observation values of the parameter data 112 were collected in the processing of Step 802, to the time set as the variable t0.

If it is determined in Step 808 that the processings of Steps 805 and 806 have not been performed on the observation values of the observation data collected in the processing of Step 802 at all the times, the CPU 211 advances the time set as the variable t by a preset time (e.g. 1 minute) (809) and returns to the processing of Step 804.

On the other hand, if it is determined in Step 808 that the processings of Steps 805 and 806 have been performed on the observation values of the observation data collected in the processing of Step 802 at all the times, the CPU 211 sets a time obtained by adding the predetermined time, during which the observation values of the parameter data 112 were collected in the processing of Step 802, to the time set as the variable t0 as the variable t0 (810) and returns to the processing of Step 802.

Figure 9:
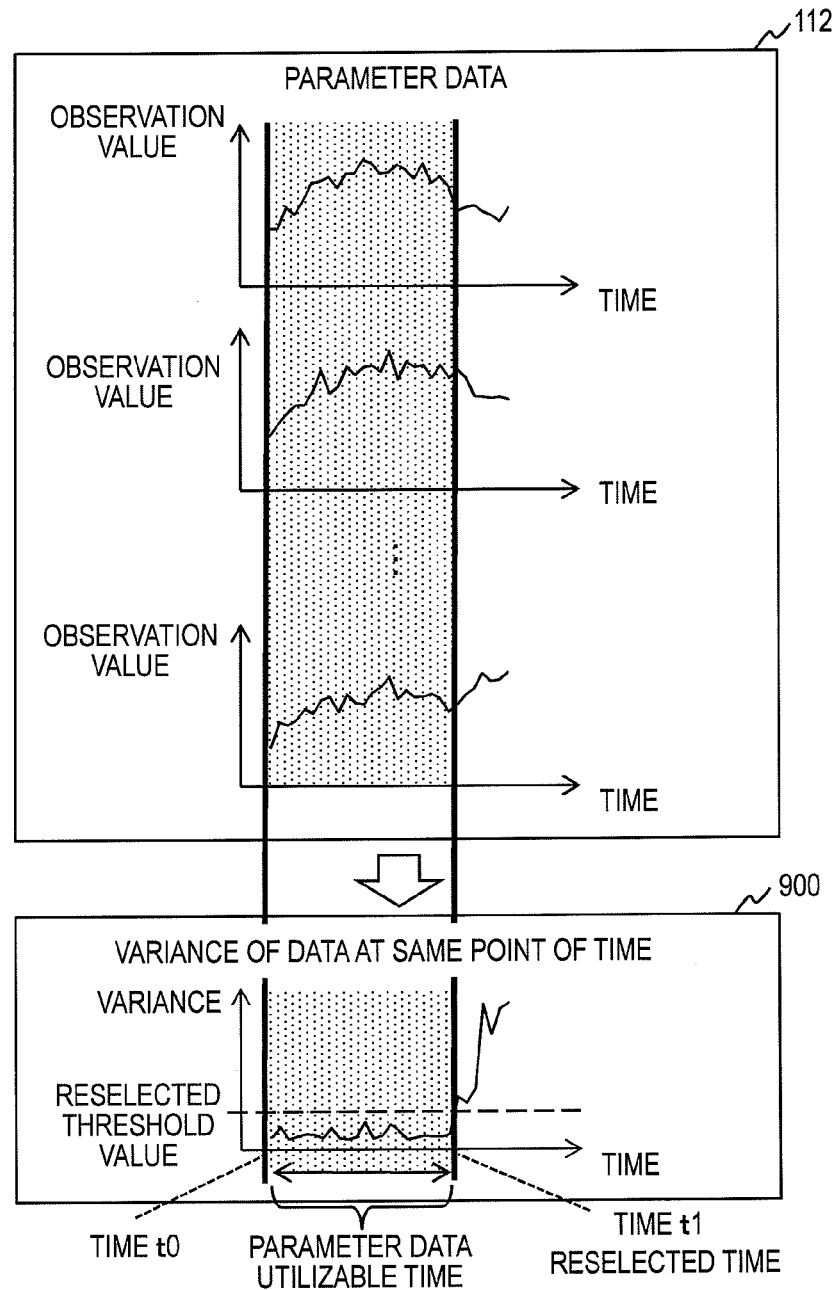
FIG. 9 is a diagram of threshold value setting range determination processing of the embodiment of the present invention.

FIG. 9 is a diagram of the threshold value setting range determination processing of the embodiment of the present invention.

In FIG. 9, the variance of the m parameter data 112 at the same point of time is shown as variance data 900. In the variance data 900, the time when the variance is become larger than the threshold value at time is shown as time t1. Thus, data from the earliest time t0 of the parameter data 112 to the time t1 are utilizable as the parameter data 112 for the calculation of the comparison value and the similar characteristic information selection unit 225 selects the past characteristic information identical or similar to the characteristic information of the current observation data 100 at time t1.

Figure 10:
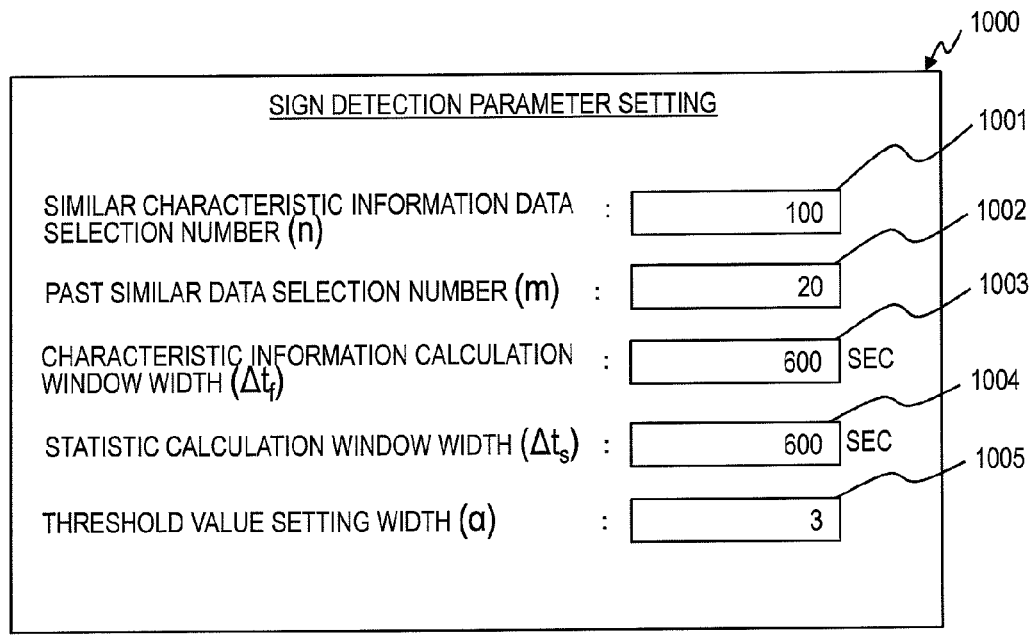
FIG. 10 is a diagram of a sign detection parameter setting screen of the embodiment of the present invention.

FIG. 10 is a diagram of the sign detection parameter setting screen 1000 of the embodiment of the present invention.

The sign detection parameter setting screen 1000 is a screen displayed on the output device 255 of the client PC 250 or the output device 215 of the sign detection system 210 before a comparison value setting process is performed by the sign detection system 210.

The sign detection parameter setting screen 1000 is a screen for receiving the input of designated values by the user for various parameters used in the comparison value setting process, and includes a similar characteristic information selection number (n) input field 1001, a past similar data selection number (m) input field 1002, a characteristic information calculation window width ($\Delta t_f$) input field 1003, a statistic calculation window ($\Delta t_s$) input field 1004 and a threshold value setting width (α) input field 1005.

The similar characteristic information selection number (n) input field 1001 is a field in which the user designates the number of pieces of characteristic information to be selected from the characteristic information DB 224 by the similar characteristic information calculation unit 226.

The past similar data selection number (m) input field 1002 is a field in which the user designates the number of observation data to be selected as the past similar data 112 by the similar waveform selection unit 227.

The characteristic information calculation window width ($\Delta t_f$) input field 1003 is a field in which the user designates a sliding window width in the case of calculating the characteristic information by the characteristic information calculation unit 223.

The statistic calculation window ($\Delta t_s$) input field 1004 is a field in which the user designates a sliding window width in the case of calculating a statistic by the statistic calculation unit 228.

The threshold value setting width ($\alpha$) input field 1005 is a field in which the user designates a parameter ($\alpha$) in the case of calculating prediction threshold values by the sign detection unit 229.

In this way, the user can set various parameters for the calculation of the prediction reference value and the prediction threshold values.

Figure 11:
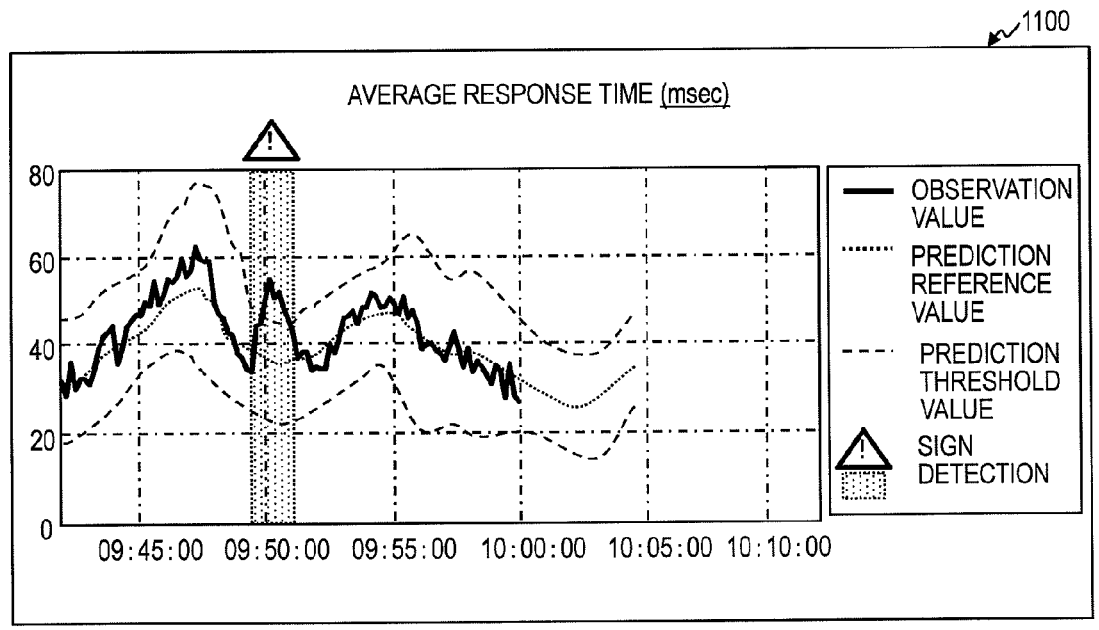
FIG. 11 is a diagram of a sign detection screen of the embodiment of the present invention.

FIG. 11 is a diagram of the sign detection screen 1100 of the embodiment of the present invention.

The sign detection screen 1100 is a screen showing observation values, prediction reference values, prediction threshold values and a sign detection area and displayed on the output device 255 of the client PC 250 or the output device 215 of the sign detection system 210.

The observation value is the one at each time of collection by the observation data collection unit 221. Since the current time is "10:00:00" in FIG. 11, the observation values until "10:00:00" are displayed and the observation data collection unit 221 updates the observation values shown in FIG. 11 every time the observation data collection unit 221 collects a new observation value.

The prediction reference value is an average value of the parameter data 112 at each time by the statistic calculation unit 228. Further, the prediction reference values until the utilizable time ("10:04:00") of the parameter data 112 are displayed.

The prediction threshold values are threshold values calculated by the sign detection unit 229. Further, similarly to the prediction reference values, the prediction threshold values until the utilizable time ("10:04:00") of the parameter data 112 are displayed.

A sign detection is for highlighting a section in which the observation data do not lie between the prediction threshold values. As a highlighting method, a background color of this section is made different from that of other sections and an icon is displayed above this section.

Further, in the case of detecting that the observation data is not in a range between the prediction threshold values, the sign detection unit 231 may notify the computer (sign detection system 210 or client PC 250) displaying the sign detection screen 1100 to display it as an event.

It should be noted that although the sign detection unit 231 determines whether or not the observation data lies between the prediction threshold values by comparing the observation data and the prediction threshold values in the present embodiment, the observation data and the prediction reference value may be compared. In this case, the sign detection unit 231 gives a notification to the user if the observation value of the observation data is larger or smaller than the prediction reference value by a predetermined value.

Although the present invention has been described in detail above with reference to the accompanying drawings, the present invention is not limited to such a specific configuration and encompasses various changes and equivalent configurations within the gist of the accompanying claims.

INDUSTRIAL APPLICABILITY

The present invention can be applied to a comparison value calculation system for automatically calculating a comparison value to be compared with observation data.

What is claimed is:

1. A data processing system for storing observation data including an observation value corresponding to a point of an observation target in a storage area and calculating a comparison value to be compared with a future observation value based on observation data stored in the storage area, the statistical value calculation system comprising:

a hardware observation data collection unit for periodically collecting the observation data from the observation target, storing the collected observation data in the storage area and specifying first observation data from a first point earlier by a first predetermined time than a current point to the current point and second observation data which are observation data before the first point;

a hardware past data selection unit for selecting at least one of parts for the same duration as the first predetermined time, the observation values of which are identical or within a predetermined range to the observation values of the first observation data for the first predetermined time, from the second observation data as past data within a predetermined range;

a hardware parameter data selection unit for selecting the observation values for a second predetermined time from the latest time of at least one of the parts selected as the past data within a predetermined range as parameter data;

a hardware comparison value calculation unit for calculating the comparison value based on the parameter data; and a hardware comparison value determination unit for determining whether or not an observation value of observation data newly collected by the hardware observation data collection unit is in excess of the comparison value, wherein the hardware comparison value determination unit:

displays the effect that the observation value is in excess of the comparison value, in a case where the observation value of the newly collected observation data is determined to be in excess of the comparison value; and displays a part, in which the observation value is in excess of the comparison value, in a color different from the color of a part in which the observation value is not in excess of the comparison value;

wherein the hardware past similar data selection unit:

calculates a characteristic amount indicating a characteristic of the observation values of a part for the same duration as the first predetermined time of the observation data;

selects at least one of parts of the second observation data, which at least one of parts is a characteristic amount in a predetermined range from a characteristic amount of the first observation data, as a past data candidate;

calculates a value of all the observation values of each selected past data candidate with respect to the observation values included in the first observation data; and selects the past data candidate identical or similar to the first observation data as the past data based on the calculated value;

wherein the observation target is data on the operation of a computer system;

the observation data includes process information capable of specifying a process performed by the computer system at a point corresponding to the observation value; and the hardware past data selection unit manages day-of-week information capable of specifying the day of week of observation of the observation data and the process information together with the characteristic amount.

2. The data processing system according to claim 1, wherein:
the hardware parameter data selection unit selects a plurality of pieces of the parameter data;
the hardware comparison value calculation unit calculates the comparison value based on the observation values of a utilization part which is a part of each pieces of the parameter data and includes a hardware utilization part specification unit for specifying the utilization part from each pieces of the parameter data;
the hardware utilization part specification unit:
calculates an average value of the observation values of all the pieces of selected parameter data at each point of time and calculates a variance of the observation values at each point from the average value;
specifies a part of each pieces of the parameter data from an earliest point to a point, at which the variance becomes equal to or higher than a predetermined value, as the utilization part;
the hardware comparison value calculation unit relates an earliest point of the utilization part specified by the utilization part specification unit to the current point and calculates the comparison value for time of the utilization part after the current point; and
the hardware past similar data selection unit selects new past data, in a case where the time of the utilization part elapses.

3. The data processing system according to claim 1, wherein the hardware comparison value calculation unit:
calculates an average value and a standard deviation of the observation values of all the pieces of parameter data selected by the parameter data selection unit at each point;
calculates a multiplication value obtained by multiplying the standard deviation by a given parameter α; and
sets a value obtained by adding the multiplication value to the calculated average value as an upper limit value of the comparison value and sets a value obtained by subtracting the multiplication value from the calculated average value as a lower limit value of the comparison value.

4. The data processing system according to claim 1, wherein the hardware past similar data selection unit:
calculates an average value of the observation values of the part of the observation data for the same duration as the first predetermined time or an average value of gradients of the observation values of the part as the characteristic amount;
calculates a coefficient of correlation between the observation values included in the first observation data and the observation values included in each selected past similar data candidate as the calculated value; and
selects the past similar data from the past similar data candidates based on values of the calculated coefficients of correlation.

5. A data processing method for calculating a comparison value to be compared with a future observation value based on observation data stored in a storage area in a computer system for storing observation data including an observation value corresponding to a point of an observation target in the storage area, the method including:
an observation data collection step including a step of periodically collecting the observation data from the observation target, a step of storing the collected observation data in the storage area and a step of specifying first observation data from a first point earlier by a first predetermined time than a current point to the current point and second observation data which are observation data before the first point;
a past data selection step of selecting at least one of parts for the same duration as the first predetermined time, the observation values of which are identical or within a predetermined range to the observation values of the first observation data for the first predetermined time, from the second observation data as past data, wherein the past data selection step includes:
a step of calculating a characteristic amount indicating a characteristic of the observation values of a part for the same duration as the first predetermined time of the observation data;
a step of selecting at least one of parts of the second observation data, which at least one of parts is a characteristic amount lying in a predetermined range from a characteristic amount of the first observation data, as a past data candidate;
a step of calculating a value of all the observation values of each selected past data candidate with respect to the observation values included in the first observation data; and
a step of selecting the past data candidate identical or within a predetermined range to the first observation data as the past data based on the calculated value;
a parameter data selection step of selecting the observation values for a second predetermined time from the latest time of at least of the parts selected as the past data within a predetermined range as parameter data;
a comparison value calculation step of calculating the comparison value based on the parameter data;
wherein:
the observation target is data on the operation of a computer system;
the observation data includes process information capable of specifying a process performed by the computer system at a point corresponding to the observation value; and
day-of-week information capable of specifying the day of week of observation of the observation data and the process information are managed together with the characteristic amount in the past similar data selection step; and
a comparison value determination step of determining whether or not an observation value of observation data newly collected by the step of collecting observation data is in excess of the comparison value, wherein the step of determining comparison value includes:
a step of displaying the effect that the observation value is in excess of the comparison value, in a case where the observation value of the newly collected observation data is determined to be in excess of the comparison value; and
a step of displaying a part, in which the observation value is in excess of the comparison value, in a color different from the color of a part in which the observation value is not in excess of the comparison value.

6. The data processing method according to claim 5, wherein:
a plurality of pieces of the parameter data are selected in the parameter data selection step;

the comparison value is calculated based on the observation values of a utilization part which is a part of each pieces of the parameter data in the comparison value calculation step;
the method includes a utilization part specification step of specifying the utilization part from each pieces of the parameter data;
the utilization part specification step includes:
   a step of calculating an average value of the observation values of all the pieces of selected parameter data at each point and calculating a variance of the observation values at each point from the average value; and
   a step of specifying a part of each pieces of the parameter data from an earliest point to a point, at which the variance becomes equal to or higher than a predetermined value, as the utilization part;
an earliest point of the utilization part specified by the step of specifying a utilization part is related to the current point and the comparison value for a time of the utilization part after the current point is calculated in the comparison value calculation step; and
new past data is selected, in a case where the time of the utilization part elapses in the step of selecting past data.

7. The data processing method according to claim 5, wherein the comparison value calculation step includes:
   a step of calculating an average value and a standard deviation of the observation values of all the pieces of parameter data selected by the step of selecting parameter data at each point;
   a step of calculating a multiplication value obtained by multiplying the standard deviation by a given parameter α; and
   a step of setting a value obtained by adding the multiplication value to the calculated average value as an upper limit value of the comparison value and setting a value obtained by subtracting the multiplication value from the calculated average value as a lower limit value of the comparison value.

8. The data processing method according to claim 5, wherein the past data selection step includes:
   a step of calculating an average value of the observation values of the part of the observation data for the same duration as the first predetermined time or an average value of gradients of the observation values of the part as the characteristic amount;
   a step of calculating a coefficient of correlation between the observation values included in the first observation data and the observation values included in each selected past similar data candidate as the calculated value; and
   a step of selecting the past data from the past data candidates based on values of the calculated coefficients of correlation.

9. A non-transitory computer readable medium containing computer instructions or program stored therein for causing a computer processor to perform a process of calculating a comparison value to be compared with a future observation value based on the observation data stored in a storage area, the process including:
   an observation data collection step including a step of collecting the observation data from the observation target, a step of storing the collected observation data in the storage area and a step of specifying first observation data from a first point earlier by a first predetermined time than a current point to the current point and second observation data which are observation data before the first point;
   a past data selection step of selecting at least one of parts for the same duration as the first predetermined time, the observation values of which are identical or within a predetermined range to the observation values of the first observation data for the first predetermined time, from the second observation data as past data within a predetermined range, wherein the past data selection step includes:
      a step of calculating a characteristic amount indicating a characteristic of the observation values of a part for the same duration as the first predetermined time of the observation data;
      a step of selecting at least one of parts of the second observation data, which at least one of the parts is a characteristic amount in a predetermined range from a characteristic amount of the first observation data, as a past similar data candidate;
      a step of calculating a value of all the observation values of each selected past similar data candidate with respect to the observation values included in the first observation data; and
      a step of selecting the past data candidate identical or within a predetermined range to the first observation data as the past similar data based on the calculated value;
   a parameter data selection step of selecting the observation values for a second predetermined time from the latest time of at least of the parts selected as the past data within a predetermined range as parameter data; and
   a comparison value calculation step of calculating the comparison value based on the parameter data; wherein:
   the observation target is data on the operation of a computer system;
   the observation data includes process information capable of specifying a process performed by the computer system at a point corresponding to the observation value; and
   day-of-week information capable of specifying the day of week of observation of the observation data and the process information are managed together with the characteristic amount in the past similar data selection step.

10. The non-transitory computer readable medium according to claim 9, wherein:
   a plurality of pieces of the parameter data are selected in the parameter data selection step;
   the comparison value is calculated based on the observation values of a utilization part which is a part of each pieces of the parameter data in the comparison value calculation step;
   the process including a utilization part specification step of specifying the utilization part from each pieces of the parameter data;
   the utilization part specification step includes:
      a step of calculating an average value of the observation values of all the pieces of selected parameter data at each point and calculating a variance of the observation values at each point from the average value; and
      a step of specifying a part of each pieces of the parameter data from an earliest point to a point, at which the variance becomes equal to or higher than a predetermined value, as the utilization part;
   an earliest point of the utilization part specified by the step of specifying a utilization part is related to the current point and the comparison value for time of the utilization part after the current point is calculated in the comparison value calculation step; and new past data is selected, in a case where the time of the utilization part elapses, in the step of selecting past data.

11. The non-transitory computer readable medium according to claim 9, wherein the comparison value calculation step includes:

a step of calculating an average value and a standard deviation of the observation values of all the pieces of parameter data selected by the step of selecting parameter data at each point;

a step of calculating a multiplication value obtained by multiplying the standard deviation by a given parameter $\alpha$; and a step of setting a value obtained by adding the multiplication value to the calculated average value as an upper limit value of the comparison value and setting a value obtained by subtracting the multiplication value from the calculated average value as a lower limit value of the comparison value.

12. The non-transitory computer readable medium according to claim 9, wherein the past similar data selection step includes:

a step of calculating an average value of the observation values of the part of the observation data for the same duration as the first predetermined time or an average value of gradients of the observation values of the part as the characteristic amount;

a step of calculating a coefficient of correlation between the observation values included in the first observation data and the observation values included in each selected past data candidate as the calculated value; and a step of selecting the past data from the past data candidates based on values of the calculated coefficients of correlation.

* * * * *